Patented Apr. 14, 1936

2,037,439

UNITED STATES PATENT OFFICE 2,037,439

FUMIGANT COMPOSITION

Hans Schrader and Erwin Bossert, Essen-Ruhr, Germany, assignors, by mesne assignments, to Union Carbide and Carbon Corporation, a corporation of New York No Drawing. Application September 6, 1929, Serial No. 390,858. In Germany September 11, 1928

8 Claims. (Cl. 167—39)

This invention relates to a fumigant composition for destroying pests and germs of all kinds in an innocuous manner.

It is known that some readily volatile organic compounds, such as ethylene oxid and propylene oxid, form excellent agents for the extermination of pests and also for suppressing germinative energy in plants or fruits. It has been proposed to employ these substances, which are inflammable in themselves, in admixture with air and at such a low degree of concentration that the mixture is no longer inflammable.

Our researches have shown that, in employing these highly inflammable gases and vapors, especially the alkylene oxids, it is practically impossible to prevent the formation, whether by accident or through oversight, of mixtures with air which are inflammable or explosive, so that damage may result, especially since in many instances, the substances to be treated, such as flour for example, are themselves highly inflammable. Another drawback resides in the fact that these substances, which, in some cases, have to be stored in pressure-proof vessels can only be employed with exhausting draught and with other suitable precautionary measures.

We have now ascertained that it is possible to prepare mixtures of alkylene oxids, such as ethylene and propylene oxids, with inert gases which contain said compounds in such concentration that, on the one hand, the mixtures are no longer inflammable, whilst, on the other hand, they contain a sufficiency of the substance to produce the desired powerful germicidal and pest-exterminating effect.

The inert gas which has been found most useful in forming the mixture is carbon dioxid. With a mixture of, for example, carbon dioxid and ethylene oxid, the limit at which the mixture with air will just ignite is represented by a composition of about 1 part of ethylene oxid to 10 parts of carbon dioxid. The mixing may be effected by positively coupling the cocks of the vessels containing the alkylene oxids and the inert gas, so that an incombustible mixture issues on the cocks being turned on. A still simpler method, however, is to mix the permissible quantity of the alkylene oxids directly with the incombustible gas in a compressed or liquid condition.

These organic compounds can be mixed, either singly or conjointly with the inert gases.

Example

An empty, pressure-proof iron cylinder capable of holding 20 kg. of carbon dioxid, is charged with 1 kg. of ethylene oxid, whereupon 20 kg. of liquid carbon dioxid are admitted, and a thorough mixing is effected by repeatedly inverting the cylinder. The ethylene oxid dissolves completely in the liquid carbon dioxid. The composition of the gas issuing from the cylinder remains constant until the latter is entirely empty, the gas containing 1 part of ethylene oxid to 20 parts of carbon dioxid. This mixture is incombustible, and is eminently suitable, for example, for exterminating the pests found in stored grain or flour.

What we claim is:

1. A composition of matter suitable for destroying pests and germs of all kinds, comprising alkylene oxids dissolved in liquid carbon dioxid under pressure.

2. A composition of matter suitable for destroying pests and germs of all kinds, comprising alkylene oxids selected from a class consisting of ethylene oxid and propylene oxid, dissolved in liquid carbon dioxid under pressure.

3. A composition of matter suitable for destroying pests and germs of all kinds, comprising ethylene and propylene oxids dissolved in liquid carbon dioxid under pressure.

4. A composition of matter suitable for destroying pests and germs of all kinds comprising ethylene oxid dissolved in liquid carbon dioxid in about the proportions of 1 part of ethylene oxid to from 10 to 20 parts of carbon dioxid by weight.

5. A composition of matter useful as a fumigant composed of a homogeneous mixture of liquefied carbon-dioxide and ethylene oxide.

6. A composition of matter useful as a fumigant composed of a homogeneous mixture of liquefied carbon dioxide and propylene oxide.

7. A composition of matter useful as a fumigant composed of a homogeneous mixture of liquefied carbon dioxide and alkylene oxide.

8. A composition of matter useful as a fumigant composed of a homogeneous mixture of liquefied carbon dioxide and at least one alkylene oxide selected from the group consisting of ethylene oxide and propylene oxide.

HANS SCHRADER.
ERWIN BOSSERT.